(12) United States Patent
Goto

(10) Patent No.: US 12,245,335 B2
(45) Date of Patent: Mar. 4, 2025

(54) SWITCH MODULE, MASTER SWITCH UNIT, AND SLAVE SWITCH UNIT

(71) Applicant: YAZAKI CORPORATION, Tokyo (JP)

(72) Inventor: Jun Goto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 767 days.

(21) Appl. No.: 17/495,272

(22) Filed: Oct. 6, 2021

(65) Prior Publication Data

US 2022/0117037 A1    Apr. 14, 2022

(30) Foreign Application Priority Data

Oct. 12, 2020 (JP) ................. 2020-171994

(51) Int. Cl.
  *G05B 15/02* (2006.01)
  *B60K 35/10* (2024.01)
  *H04W 84/20* (2009.01)

(52) U.S. Cl.
  CPC ............ *H04W 84/20* (2013.01); *B60K 35/10* (2024.01); *G05B 15/02* (2013.01); *G05B 2219/2637* (2013.01)

(58) Field of Classification Search
  CPC . H04W 84/20; B60K 35/10; B60K 2360/111; B60K 2360/122; B60K 2360/128; B60K 2360/34; G05B 15/02; G05B 2219/2637
  USPC ........................................................ 307/9.1
  See application file for complete search history.

(56) References Cited

U.S. PATENT DOCUMENTS

| 5,990,571 | A | 11/1999 | Sato et al. |
| 2011/0254373 | A1 | 10/2011 | Johnson |
| 2012/0313653 | A1 | 12/2012 | Jeong et al. |
| 2018/0334117 | A1 * | 11/2018 | Matsunaga ......... B60R 16/0207 |

FOREIGN PATENT DOCUMENTS

| CN | 101483335 A |   | 7/2009 |
| JP | 10-6884 A |   | 1/1998 |
| JP | 2012-113571 A |   | 6/2012 |
| JP | 2012113571 | * | 6/2012 |
| JP | 2017-149332 A |   | 8/2017 |

* cited by examiner

*Primary Examiner* — Elim Ortiz
*Assistant Examiner* — Xuan Ly
(74) *Attorney, Agent, or Firm* — Sughrue Mion, PLLC

(57) ABSTRACT

A switch module includes a master switch unit and a slave switch unit. The master switch unit includes a master substrate, a determination unit mounted on the master substrate and configured to determine an ON/OFF state of a switch portion connected to the determination unit, a master-side switch portion mounted on the master substrate and connected to the determination unit, and at least one master-side connector mounted on the master substrate and connected to the determination unit. The slave switch unit includes a slave substrate, a slave-side switch portion mounted on the slave substrate, and a first slave-side connector mounted on the slave substrate and connected to the slave-side switch portion. The master-side connector is connected to the first slave-side connector.

3 Claims, 15 Drawing Sheets

FIG. 10A
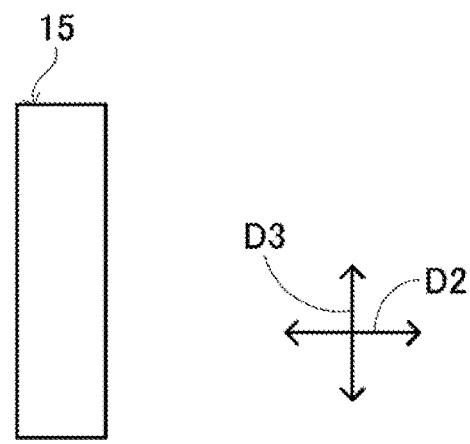
FIG. 10C  FIG. 10B  FIG. 10D
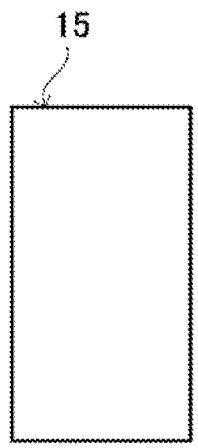  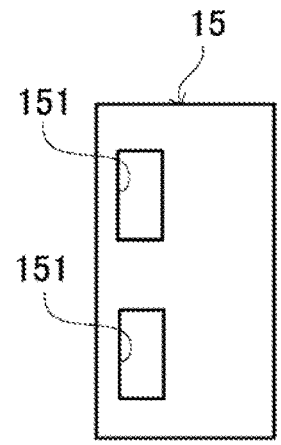

SWITCH MODULE, MASTER SWITCH UNIT, AND SLAVE SWITCH UNIT

CROSS-REFERENCE TO RELATED APPLICATIONS

This application is based on and claims priority under 35 USC 119 from Japanese Patent Application No. 2020-171994 filed on Oct. 12, 2020, the contents of which are incorporated herein by reference.

The present disclosure relates to a switch module, a master switch unit, and a slave switch unit.

BACKGROUND ART

As the above switch module, for example, a control device of a vehicle-mounted device disclosed in JP-A-10-6884 has been proposed. In the control device of the vehicle-mounted device disclosed in JP-A-10-6884, a control unit determines ON/OFF states of a plurality of switch portions.

Generally, in the above control device of the vehicle-mounted device, a plurality of switch portions and a control unit are mounted on one substrate. The number of switch portions may change depending on a specification of a vehicle. In this case, the substrate has a size capable of mounting a maximum number of switch portions, and a number of switch portions that match the specification of the vehicle are mounted on the substrate. Therefore, there is a problem that it is necessary to use a substrate capable of mounting a maximum number of switch portions even when a small number of switch portions are mounted on the substrate.

SUMMARY OF INVENTION

The present disclosure has been made in view of the above circumstances, and an object of the present disclosure is to provide a switch module, a master switch unit, and a slave switch unit that can obtain a substrate size which is a size corresponding to the number of switches to be mounted.

In order to achieve the above object, a switch module, a master switch unit, and a slave switch unit according to the present disclosure are characterized as follows.

According to an aspect of the present disclosure, there is provided a switch module including: a master switch unit including: a master substrate, a determination unit mounted on the master substrate and configured to determine an ON/OFF state of a switch portion connected to the determination unit, a master-side switch portion mounted on the master substrate and connected to the determination unit, and at least one master-side connector mounted on the master substrate and connected to the determination unit; and at least one slave switch unit including: a slave substrate, a slave-side switch portion mounted on the slave substrate, and a first slave-side connector mounted on the slave substrate and connected to the slave-side switch portion, in which the master-side connector is connected to the first slave-side connector.

According to an aspect of the present disclosure, there is provided a master switch unit including: a master substrate, a determination unit mounted on the master substrate and configured to determine an ON/OFF state of a switch portion connected to the determination unit, a master-side switch portion mounted on the master substrate and connected to the determination unit, and a master-side connector mounted on the master substrate and connected to the determination unit.

According to an aspect of the present disclosure, there is provided a slave switch unit including: a slave substrate, a slave-side switch portion mounted on the slave substrate, and a first slave-side connector mounted on the slave substrate and connected to the slave-side switch portion.

According to the present disclosure, it is possible to provide a switch module that can obtain a substrate size corresponding to the number of switches, a master switch unit and a slave switch unit that can be used for the switch module.

The present disclosure has been briefly described above. Further, details of the present disclosure will be clarified by reading a mode (hereinafter, referred to as an "embodiment") for carrying out the disclosure to be described below with reference to the accompanying drawings.

BRIEF DESCRIPTION OF DRAWINGS

FIGS. 10A to 10D are a front view, a rear view, a left side view, and a right side view of a first side case shown in FIG. 1.

DESCRIPTION OF EMBODIMENTS

First Embodiment

A specific first embodiment according to the present disclosure will be described below with reference to the drawings.

Figure 1:
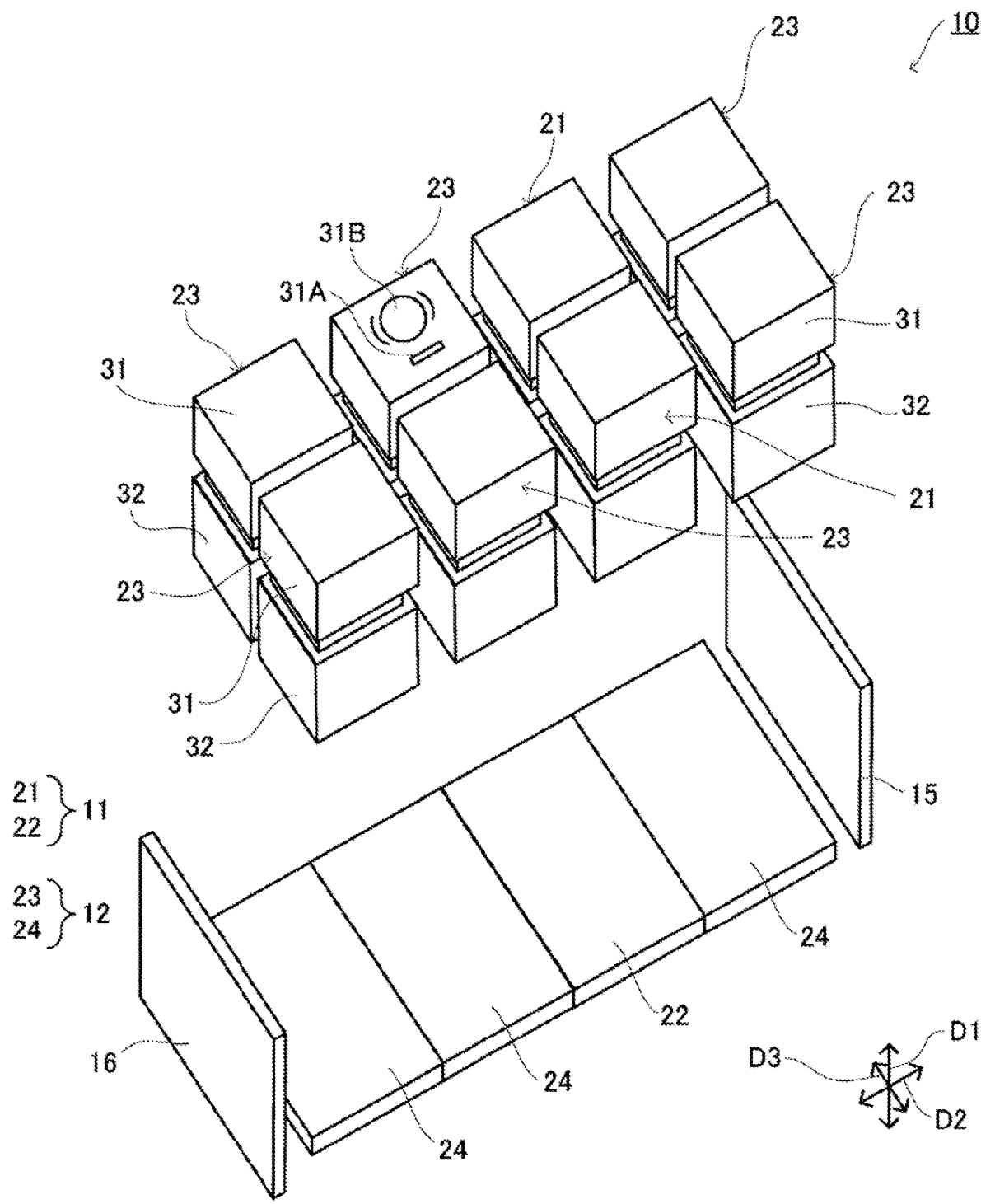
FIG. 1 is a schematic exploded perspective view showing a switch module according to a first embodiment.

As shown in FIG. 1, a switch module 10 includes one master switch unit 11 and one or more slave switch units 12. The switch module 10 can connect, for example, a number of slave switch units 12 that match a specification of a vehicle to one master switch unit 11. In an example shown in FIG. 1, three slave switch units 12 are provided.

The master switch unit 11 includes a master-side switch portion 21 operated by an occupant and a master mounting portion 22 on which two master-side switch portions 21 are detachably mounted. The slave switch unit 12 includes a slave-side switch portion 23 operated by the occupant and a slave mounting portion 24 on which two slave-side switch portions 23 are detachably mounted.

The master-side switch portion 21 and the slave-side switch portion 23 have the same configuration. The switch portions 21 and 23 include an operation unit 31 that is pushed by the occupant, a switch body 32 to which the operation unit 31 is attached, and a switch substrate 33 (FIGS. 2 and 4) accommodated in the switch body 32. In the present embodiment, as the switch portions 21 and 23, the switch portion in which a push operation is performed will be described as an example, but the present disclosure is not limited thereto. As for the switch portions 21 and 23, a dial operation, a seesaw operation, or the like may be performed.

As shown in FIG. 1, the operation unit 31 is provided with a lamp design 31A indicating an ON/OFF state of the switch portions 21 and 23 on a front side, and a functional design 31B indicating functions of the switch portions 21 and 23. In the example shown in FIG. 1, in order to simplify the drawing, the lamp design 31A and the functional design 31B are provided in one switch portion 23, but in practice, the lamp design 31A and the functional design 31B are provided in all the switch portions 21 and 23 that function as switches.

Figure 2:
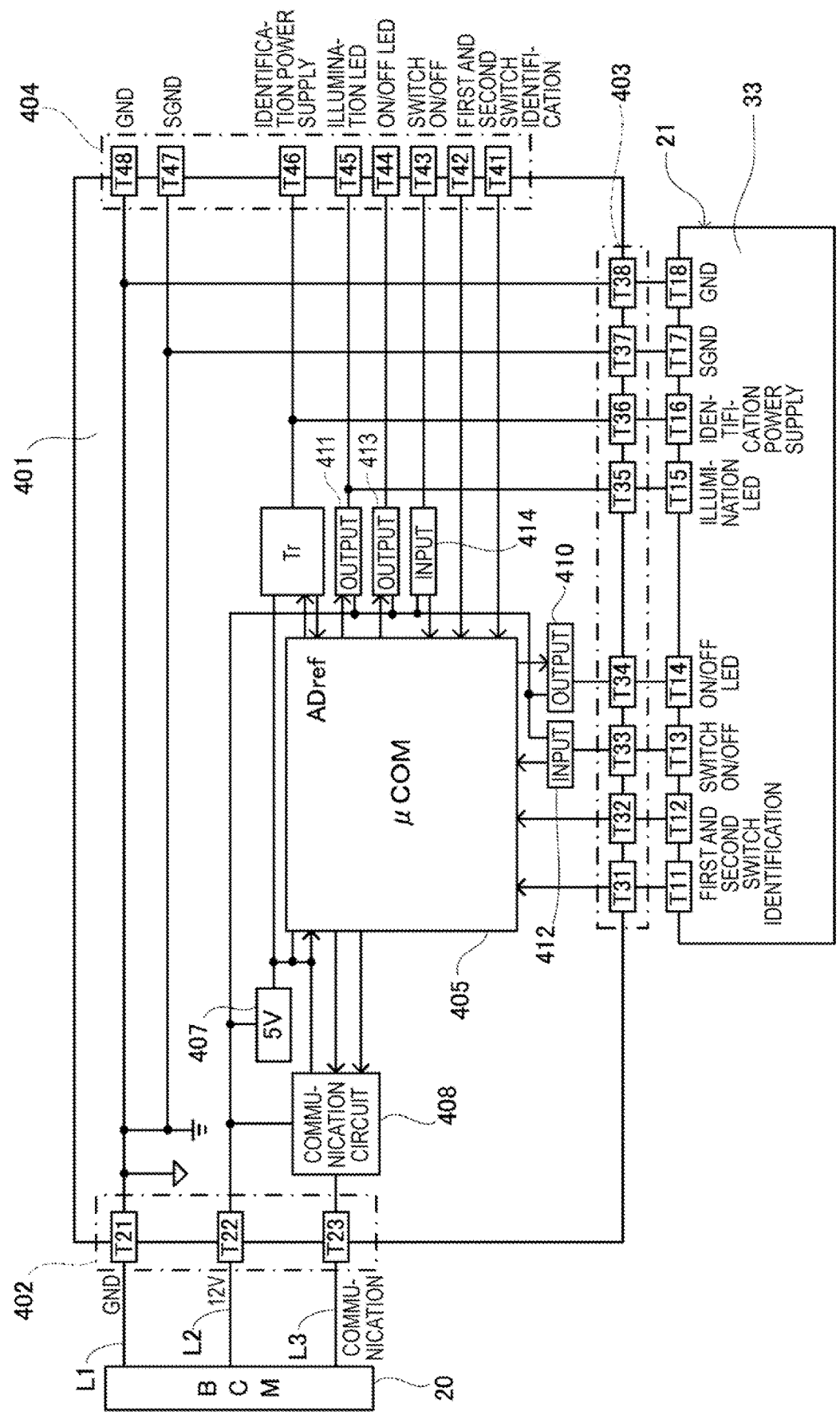
FIG. 2 is a circuit diagram of a master switch unit shown in FIG. 1.
Figure 4:
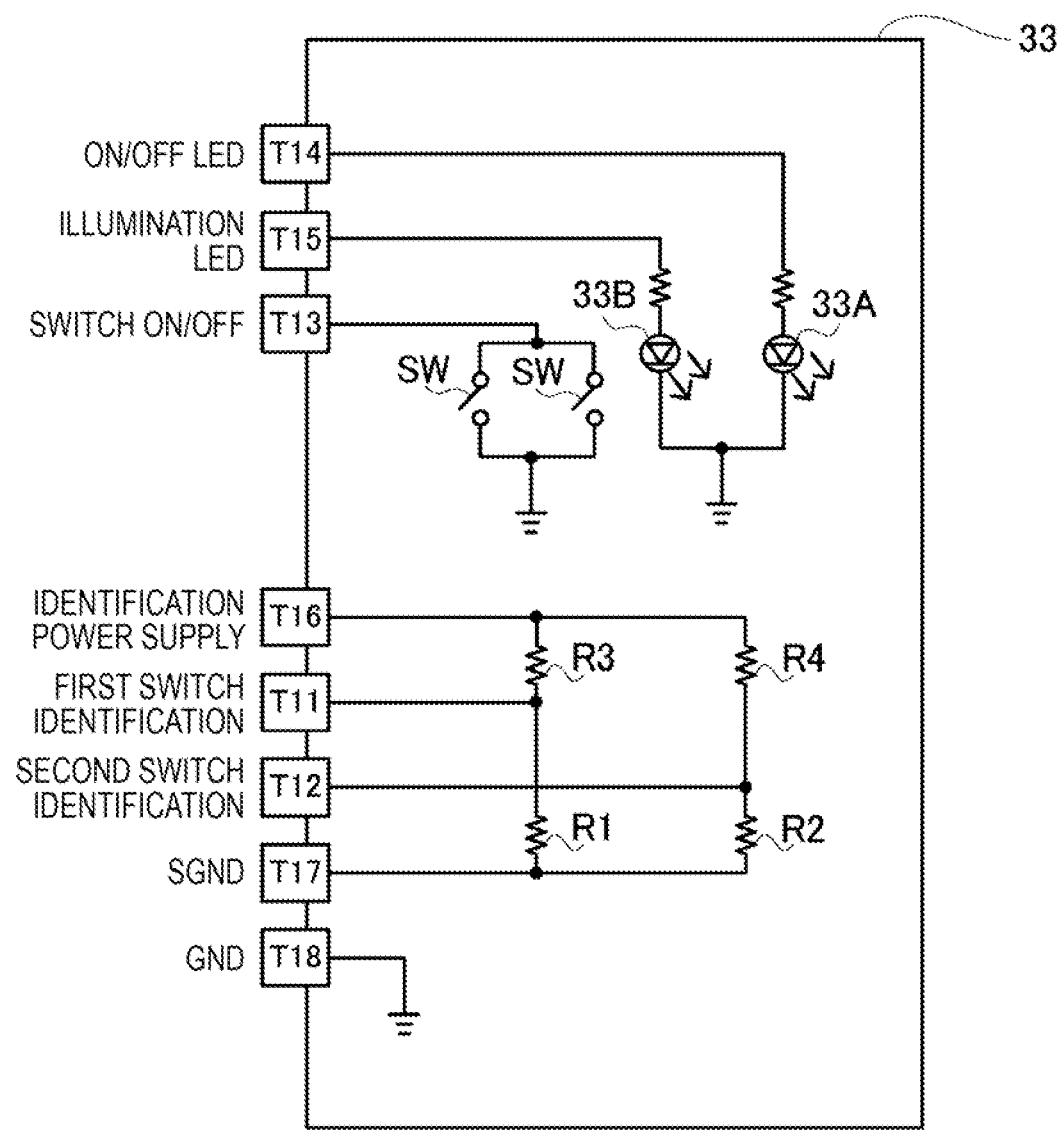
FIG. 4 is a circuit diagram of a switch substrate accommodated in a switch body shown in FIG. 1.

As shown in FIGS. 2 and 4, a connector (not shown) having terminals T11 to T18 is mounted on the switch substrate 33. The switch substrate 33 can be connected to a master substrate 401 and a slave substrate 501, which will be described later, via these terminals T11 to T18.

As shown in FIG. 4, on the switch substrate 33, an ON/OFF LED 33A that turns on the above lamp design 31A, an illumination LED 33B that turns on the above functional design 31B, and two switch contacts SW that are turned on or off in response to the above push operation are mounted. One ends of the above ON/OFF LED 33A and the illumination LED 33B are connected to ground, and the other ends of the ON/OFF LED 33A and the illumination LED 33B are connected to separate ON/OFF LED terminal T14 and illumination LED terminal T15. The two switch contacts SW, SW are connected in parallel to each other, one end of each switch contact SW is connected to the ground, and the other end of each switch contact SW is commonly connected to a switch ON/OFF terminal T13.

In addition, two function determination resistors R1 and R2 and two voltage division resistors R3 and R4 are mounted on the switch substrate 33. The function determination resistor R1 and the voltage division resistor R3 are connected in series. The function determination resistor R2 and the voltage division resistor R4 are connected in series. A series circuit including the resistors R1 and R3 and a series circuit including the resistors R2 and R4 are connected in parallel. Resistor values of the two function determination resistors R1 and R2 are set so as to be a combination corresponding to functions of the switch portions 21 and 23.

Both ends of the series circuit including the resistors R1 and R3 and both ends of the series circuit including the resistors R2 and R4 are connected in common to an identification power supply terminal T16 and an SGND terminal T17. A point between the resistor R1 and the resistor R3 are connected to a first switch identification terminal T11, and a point between the resistor R2 and the resistor R4 are connected to a second switch identification terminal T12. A circuit that supplies ground to the switch substrate 33 is connected to the terminal T18.

Figure 5A:
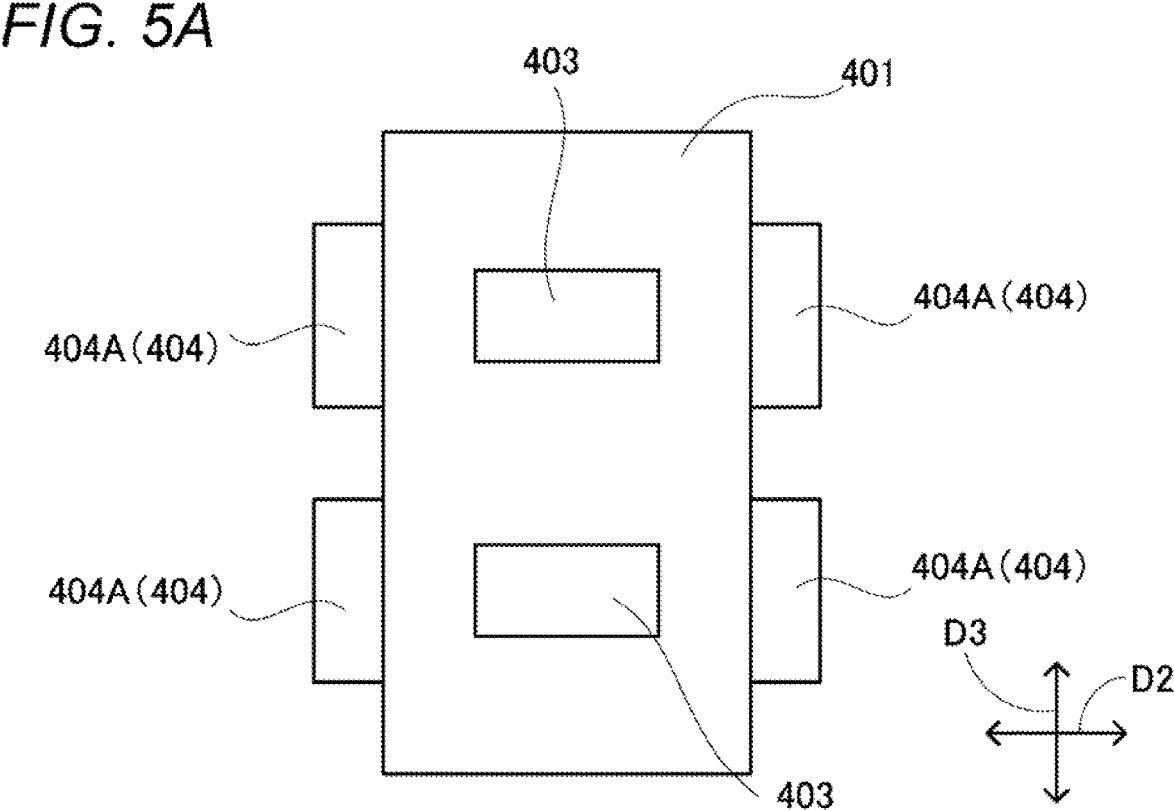
FIGS. 5A and 5B are a front view and a rear view of a master substrate forming a master mounting portion shown in FIG. 1.
Figure 5B:
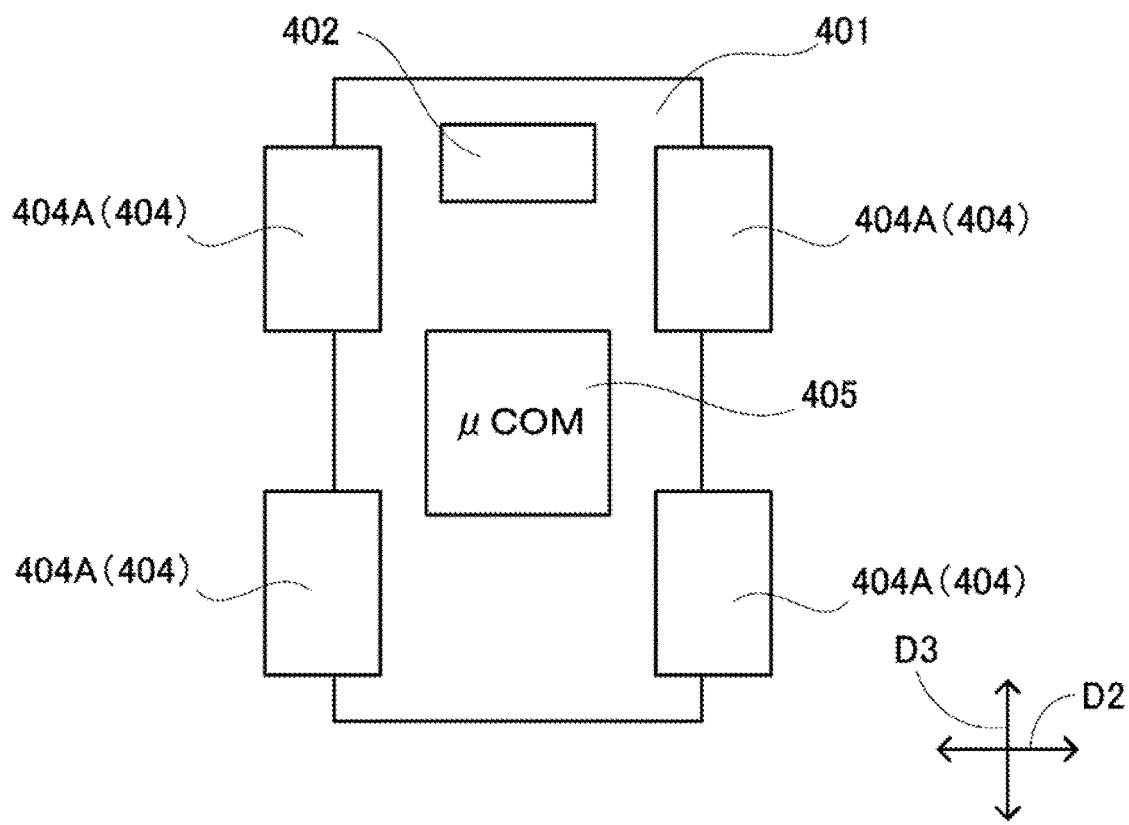

As shown in FIGS. 5A and 5B, the master mounting portion 22 includes the flat plate-shaped master substrate 401, a BCM connector 402, a switch portion connector 403, a plurality of master-side connectors 404 mounted on the master substrate 401, and a microcomputer 405 that determines the functions of the switch portions 21 and 23 and determines ON/OFF states of the switch portions 21 and 23. The microcomputer 405 includes a microcomputer including a well-known CPU, ROM, and RAM, and controls the entire switch module 10. As shown in FIG. 2, the master mounting portion 22 includes a power supply circuit 407 and a communication circuit 408. As shown in FIGS. 6A to 6D, the master mounting portion 22 includes a case 409 that accommodates the master substrate 401.

The master substrate 401 is formed in a rectangular shape. The BCM connector 402 is a connector that connects a body control module (BCM) 20 (FIG. 2) as a control unit that communicates with the microcomputer 405. As shown in FIG. 5B, the BCM connector 402 and the microcomputer 405 are disposed side by side in a longitudinal direction D3 on a back surface of the master substrate 401 on one side in a thickness direction D1. As shown in FIG. 2, the BCM connector 402 includes a ground terminal T21, a power supply terminal T22, a communication terminal T23, and a housing (not shown) that accommodates the terminals T21 to T23. The master substrate 401 is connected to the BCM 20 via a GND line L1, a power supply line L2, and a multiplex communication line L3 that can be connected to the GND terminal T21, the power supply terminal T22, and the communication terminal T23.

The switch portion connector 403 is a connector that connects the switch portion 21. As shown in FIG. 5A, two switch portion connectors 403 are disposed side by side along the longitudinal direction D3 at a center in a transverse direction D2 on a surface of the master substrate 401 on the other side in the thickness direction D1. The thickness direction D1, the transverse direction D2, and the longitudinal direction D3 are directions orthogonal to each other.

As shown in FIG. 2, the switch portion connector 403 includes terminals T31 to T38 that are electrically connected to the terminals T11 to T18 of the switch portion 21, and a housing (not shown) that accommodates these terminals T31 to T38. In FIG. 2, only one of the two switch portion connector 403 is shown, and a remaining one is omitted. The switch portion connector 403 is provided such that the thickness direction D1 of the master substrate 401 is a fitting direction. The switch portion 21 is detachably mounted on the surface of the master substrate 401 by the switch portion connector 403.

The above terminals T31 to T36 are connected to the above microcomputer 405. More specifically, the ON/OFF LED terminal T34 and the illumination LED terminal T35 are connected to output ports of the microcomputer 405 via output circuits 410 and 411. Accordingly, the microcomputer 405 is connected to the ON/OFF LED 33A and the illumination LED 33B via the ON/OFF LED terminals T34 and T14 and the illumination LED terminals T35 and T15, and can control turning-on of the ON/OFF LED 33A and the illumination LED 33B. A switch ON/OFF terminal T33 is connected to an input port of the microcomputer 405 via an input circuit 412. Accordingly, the microcomputer 405 is connected to the switch contact SW via the switch ON/OFF terminals T33 and T13, and can determine an ON/OFF state of the switch contact SW.

The identification power supply terminal T36 is connected to a transistor Tr connected to the power supply circuit 407 that outputs a 5V power supply. The transistor Tr is connected to the microcomputer 405, and ON/OFF is controlled by the microcomputer 405 to turn on or off the 5V power supply output to the identification power supply terminal T36. The SGND terminal T37 and the GND terminal T38 are connected to the ground terminal T21. Accordingly, when the transistor Tr is turned on, the microcomputer 405 applies a voltage to both ends of the series circuit of the resistors R1 and R3 and the series circuit of the resistors R2 and R4. The first and second switch identification terminals T31 and T32 are connected to AD ports of the microcomputer 405. Input voltages to the AD ports (output voltages of the first and second switch identification terminals T11 and T12) are voltages corresponding to the resistor values of the function determination resistors R1 and R2. The microcomputer 405 determines the function of the switch portion 21 based on a combination of the input voltages to the two AD ports.

When the transistor Tr is turned on, the microcomputer 405 is supplied with a voltage divided by a voltage dividing resistor (not shown) of the 5V power supply to the ADref. At this time, since the microcomputer 405 performs an AD conversion using a divided voltage of the 5V power supply input to the ADref as a reference voltage, even if the 5V power supply varies, the input voltage to the AD port can be correctly identified according to the resistor values of the function determination resistors R1 and R2.

The master-side connector 404 is a connector that connects the slave substrate 501 to be described later. As shown in FIG. 5B, two master-side connectors 404 are disposed side by side in the longitudinal direction D3 at both end portions in the transverse direction D2 on the back surface of the master substrate 401. That is, in the present embodiment, four master-side connectors 404 are provided. As shown in FIG. 2, the master-side connector 404 includes two sets of terminals T41 to T48 connected to the slave switch unit 12 and a housing 404A (FIGS. 5A to 6D) that accommodates these two sets of terminals T41 to T48. In FIG. 2, only one of the four master-side connectors 404 is shown, and remaining three are omitted. In FIG. 2, only one of the two sets of terminals T41 to T48 is shown, and a remaining one set is omitted. The master-side connector 404 is provided such that the transverse direction D2 of the master substrate 401 is the fitting direction.

The master-side connector 404 is connected to the microcomputer 405. More specifically, an ON/OFF LED terminal T44 and an illumination LED terminal T45 are connected to output ports of the microcomputer 405 via output circuits 413 and 411. The illumination LED terminal T35 of the switch portion connector 403 and the illumination LED terminal T45 of the plurality of master-side connectors 404 are commonly connected to the output circuit 411.

A switch ON/OFF terminal T43 is connected to an input port of the microcomputer 405 via an input circuit 414. The identification power supply terminal T46 is connected to a transistor Tr connected to the power supply circuit 407 that outputs a 5V power supply. First and second switch identification terminals T41 and T42 are input to AD ports of the microcomputer 405. SGND terminal T47 and GND terminal T48 are connected to the ground terminal T21.

In the present embodiment, the master-side connector 404 disposed on a right side and an upper side of the master substrate 401 in FIG. 5A is a dummy connector and is not connected to the microcomputer 405. That is, the microcomputer 405 of the present embodiment can determine a function and an ON/OFF state of the switch portion 23 by connecting to three master-side connectors 404 and to a maximum three slave substrates 501. In the present embodiment, as described above, an example in which three master-side connectors 404 are connected to the microcomputer 405 will be described, but the present disclosure is not limited thereto. The number of the master-side connectors 404 connected to the microcomputer 405 may be one or more, and may be one or four or more.

The power supply circuit 407 is a circuit that generates a 5V power supply from a 12V power supply supplied from the power supply terminal T22. The communication circuit 408 is an interface that is connected to the communication terminal T23 and connects the microcomputer 405 and the BCM 20. The microcomputer 405 transmits the functions and the ON/OFF states of the switch portions 21 and 23 connected to the microcomputer 405 to the BCM 20.

Figure 6A:
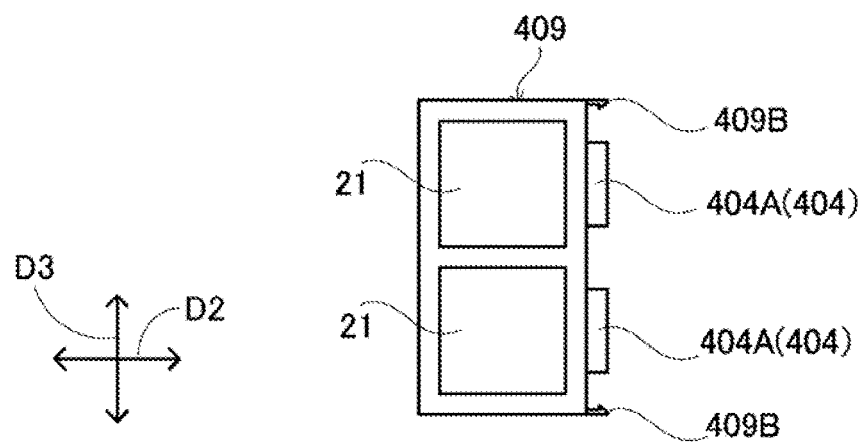
FIGS. 6A to 6D are a front view, a rear view, a left side view, and a right side view of the master switch unit shown in FIG. 1.
Figure 6C:
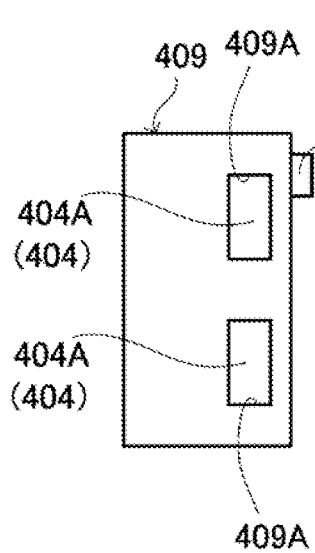
Figure 6B:
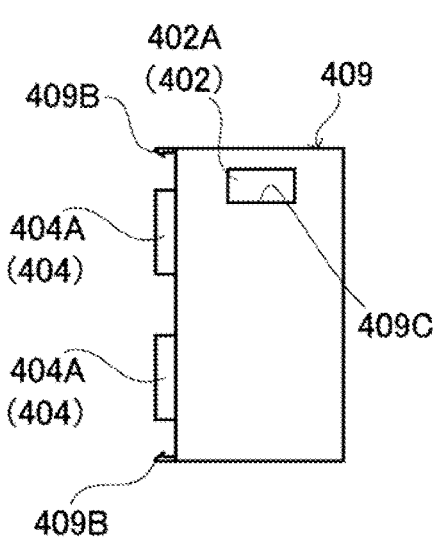
Figure 6D:
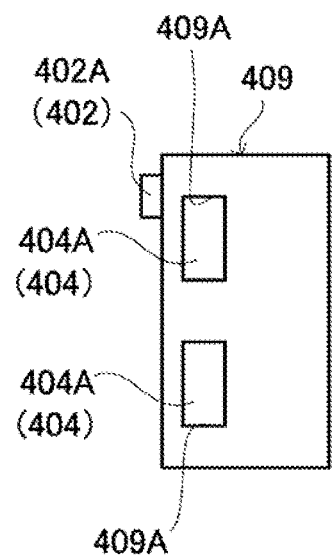

The case 409 is made of an insulating member such as a synthetic resin. As shown in FIGS. 6C and 6D, the case 409 is provided with exposure holes 409A on both side faces in the transverse direction D2 that expose the master-side connector 404. The housing 404A of the master-side connector 404 provided on one side in the transverse direction D2 is a male housing that protrudes from the exposure hole 409A, and is fitted to a female housing. The housing 404A of the master-side connector 404 provided on the other side in the transverse direction D2 is a female housing accommodated in the case 409 and is fitted to a male housing.

The case 409 is provided with a pair of locking claws 409B on a side face on one side in the transverse direction D2. The locking claws 409B are locked to a case 505 of the slave mounting portion 24 adjacent to one side of the transverse direction D2. As shown in FIG. 6B, the case 409 is provided with an exposure hole 409C on the back surface that exposes the BCM connector 402. A housing 402A of the BCM connector 402 is a male housing protruding from the exposure hole 409C. In the present embodiment, the housings 402A and 404A of the connectors 402 and 404 are provided separately from the case 409, but the present disclosure is not limited thereto, and the housings 402A and 404A may be provided integrally with the case 409.

Figure 7A:
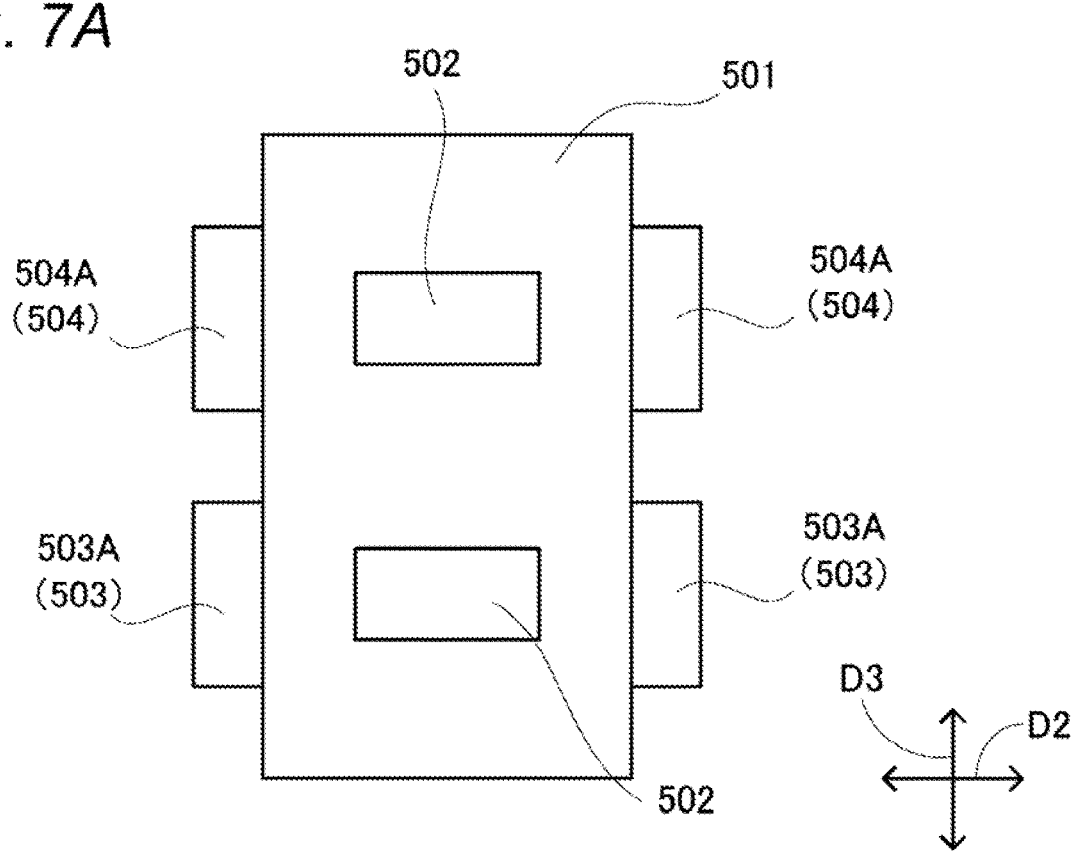
FIGS. 7A and 7B are a front view and a rear view of a slave substrate forming a slave mounting portion shown in FIG. 1.
Figure 7B:
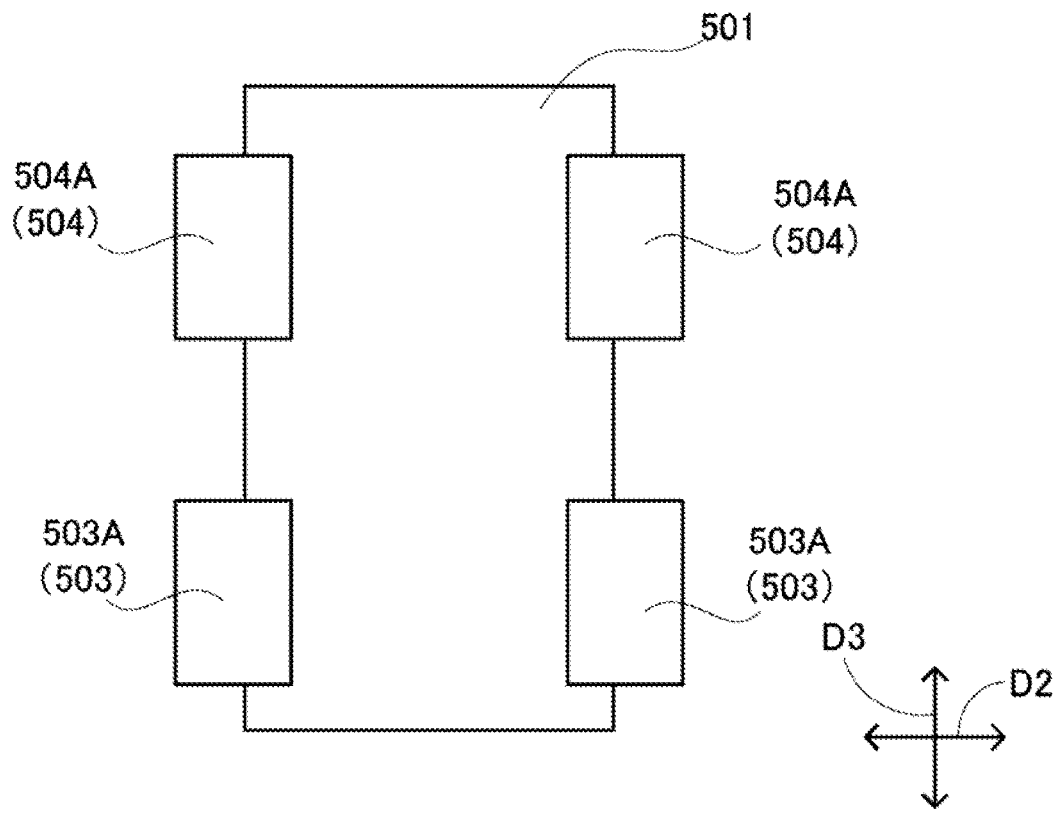

As shown in FIGS. 7A and 7B, the slave mounting portion 24 includes the flat plate-shaped slave substrate 501, a switch portion connector 502, a pair of first slave-side connectors 503, 503, and a pair of second slave-side connectors 504, 504 mounted on the slave substrate 501. As shown in FIGS. 8A to 8D, the slave mounting portion 24 includes the case 505 that accommodates the slave substrate 501.

Figure 3:
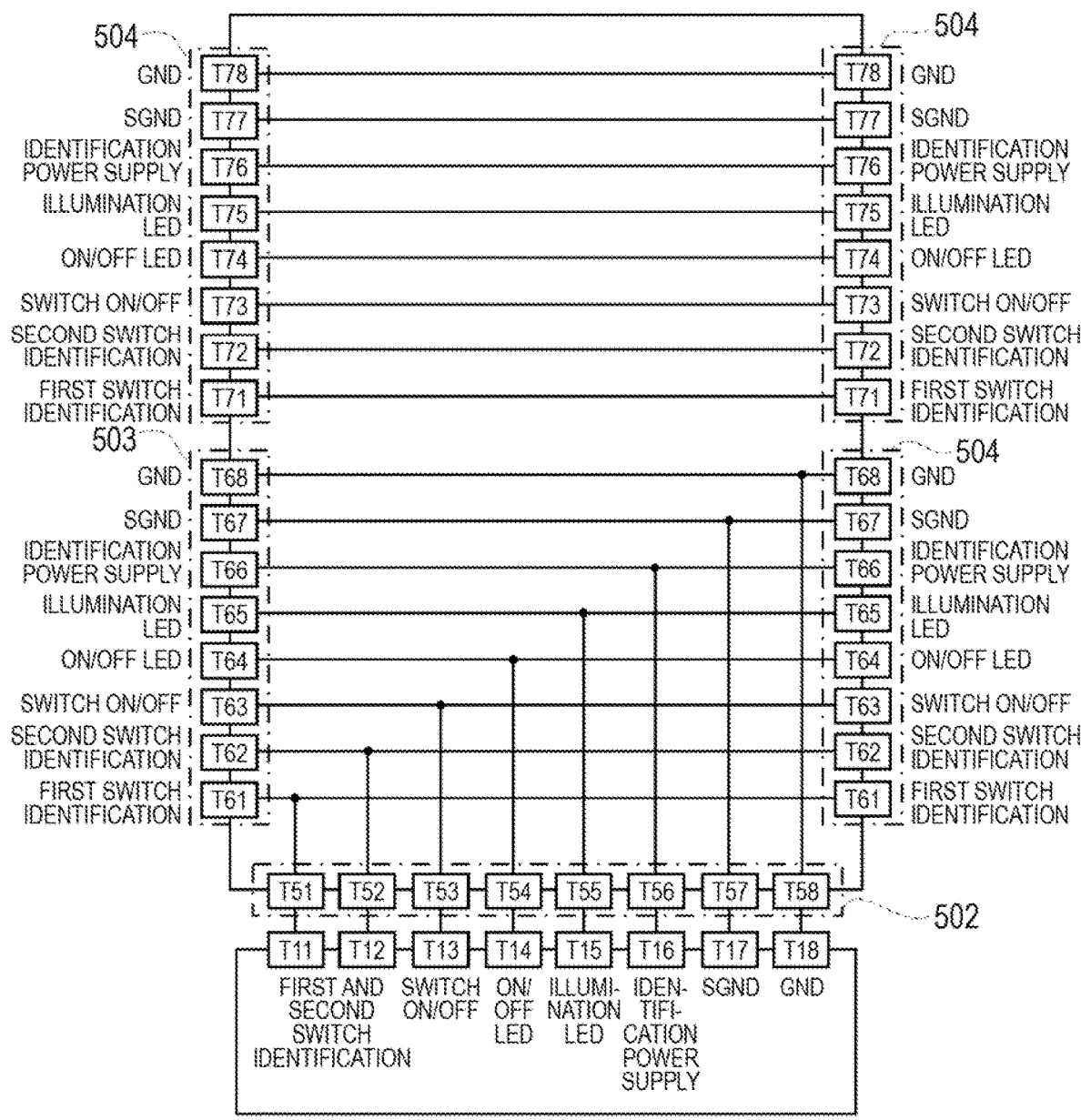
FIG. 3 is a circuit diagram of a slave switch unit shown in FIG. 1.

The slave substrate 501 is formed in a rectangular shape. The switch portion connector 502 is a connector that connects the switch portion 23. As shown in FIG. 7A, two switch portion connectors 502 are disposed side by side along the longitudinal direction D3 at the center in the transverse direction D2 on a surface of the slave substrate 501. As shown in FIG. 3, the switch portion connector 502 includes terminals T51 to T58 that are fitted and electrically connected to the terminals T11 to T18 of the switch portion 23, and a housing (not shown) that accommodates these terminals T51 to T58. In FIG. 3, only one of the two switch portion connector 502 is shown, and a remaining one is omitted. The switch portion connector 502 is provided such that the thickness direction D1 of the slave substrate 501 is the fitting direction.

As shown in FIG. 3, the pair of first slave-side connectors 503, 503 are connected to the switch portion connector 502. As shown in FIGS. 7A and 7B, the pair of first slave-side connectors 503, 503 are disposed at both end portions in the transverse direction D2 on the back surface of the slave substrate 501. The pair of first slave-side connectors 503, 503 are provided such that the transverse direction D2 of the slave substrate 501 is the fitting direction.

As shown in FIG. 3, the first slave-side connector 503 includes two sets of terminals T61 to T68 and a housing 503A (FIGS. 7A to 8D) that accommodates these two sets of terminals T61 to T68. In FIG. 3, only one of the two sets of terminals T61 to T68 is shown, and a remaining one is omitted. The terminals T61 to T68 are connected to the terminals T51 to T58 of the switch portion connector 502.

The pair of second slave-side connectors 504, 504 are connected to each other. As shown in FIGS. 7A and 7B, the pair of second slave-side connectors 504, 504 are disposed on both end portions in the transverse direction D2 on the back surface of the slave substrate 501. The first slave-side connector 503 and the second slave-side connector 504 are disposed side by side in the longitudinal direction D3. The pair of second slave-side connectors 504, 504 are provided such that the transverse direction D2 of the slave substrate 501 is the fitting direction.

As shown in FIG. 3, the second slave-side connector 504 includes two sets of terminals T71 to T78 and a housing 504A (FIGS. 7A to 8D) that accommodates these two sets of terminals T71 to T78. In FIG. 3, only one of the two sets of terminals T71 to T78 is shown, and a remaining one is omitted. The terminals T71 to T78 of the pair of second slave-side connectors 504, 504 are connected to each other.

Figure 8A:
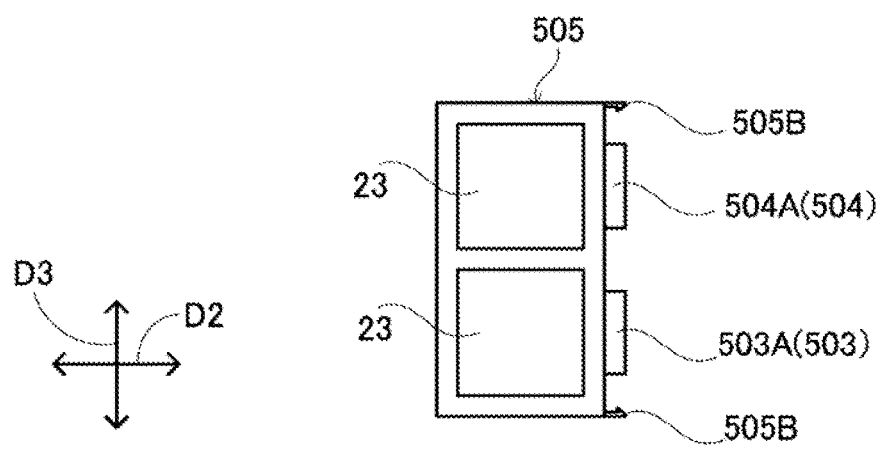
FIGS. 8A to 8D are a front view, a rear view, a left side view, and a right side view of the slave switch unit shown in FIG. 1.
Figure 8C:
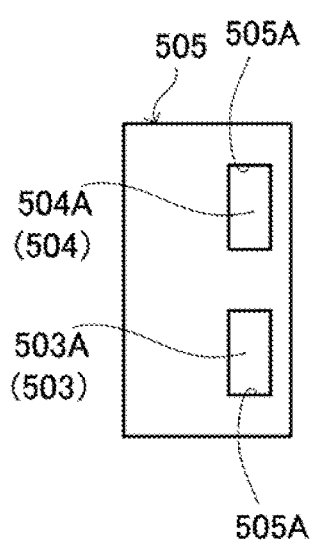
Figure 8B:
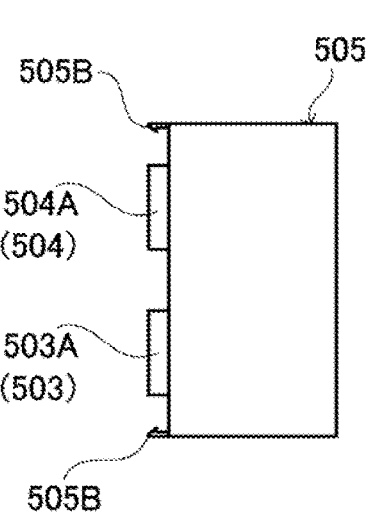
Figure 8D:
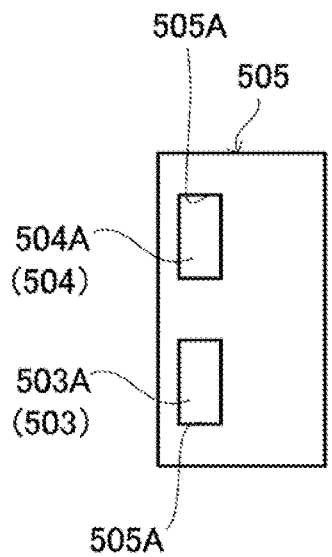

The case 505 is made of an insulating member such as a synthetic resin. As shown in FIGS. 8C and 8D, the case 505 is provided with exposure holes 505A on both side faces in the transverse direction D2 that expose the first and second slave-side connectors 503 and 504. The housings 503A and 504A of the first and second slave-side connectors 503 and 504 provided on one side in the transverse direction D2 are male housings that protrude from the exposure holes 505A, and are fitted to female housings. The housings 503A and 504A of the first and second slave-side connectors 503 and 504 provided on the other side in the transverse direction D2 are female housings accommodated in the case 505 and are fitted to male housings. The case 505 is provided with a pair of locking claws 505B on a side face on one side in the transverse direction D2. The pair of locking claws 505B are locked to cases 409 and 505 of the master mounting portion 22 and another slave mounting portions 24 adjacent to one side in the transverse direction D2. In the present embodiment, the housings 503A and 504A of the connectors 503 and 504 are provided separately from the case 505, but the present disclosure is not limited thereto, and the housings 503A and 504A may be provided integrally with the case 505.

Figure 9:
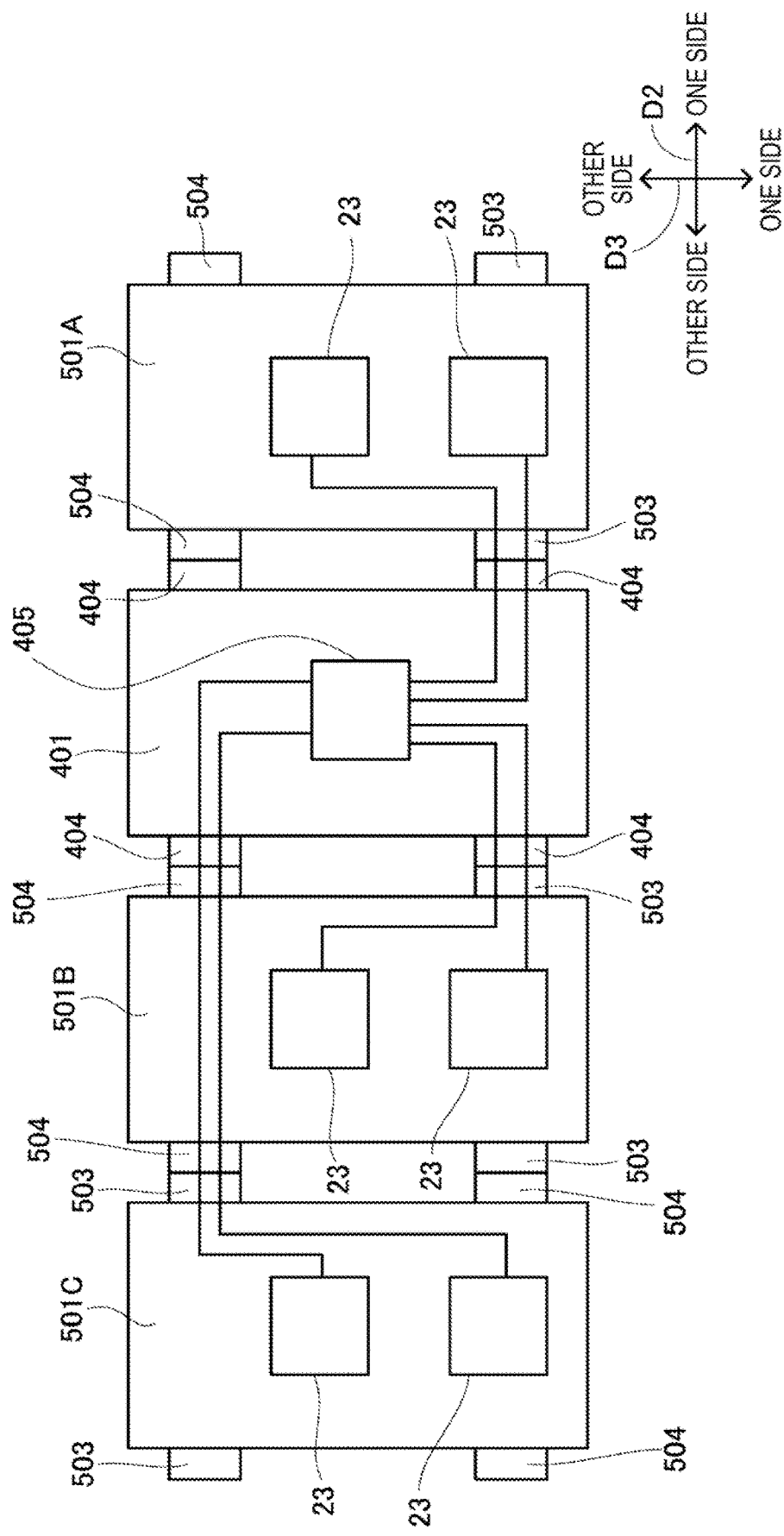
FIG. 9 is a schematic electrical configuration diagram of the switch module shown in FIG. 1.
Figure 11A:
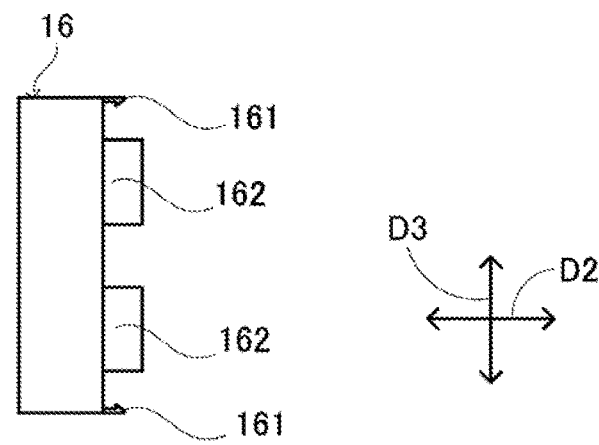
FIGS. 11A to 11D are a front view, a rear view, a left side view, and a right side view of a second side case shown in FIG. 1.
Figure 11C:
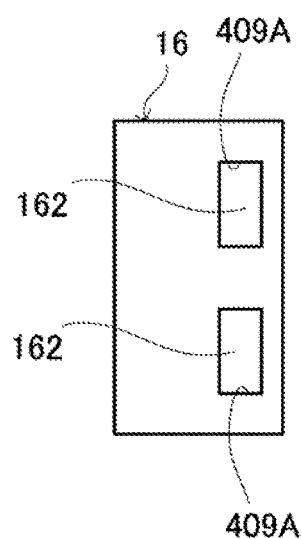
Figure 11B:
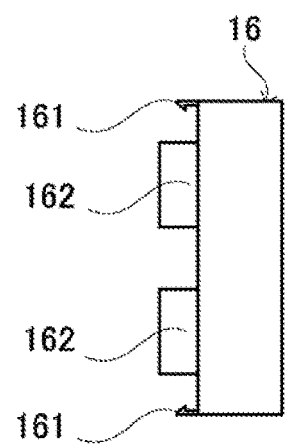
Figure 11D:

Next, connection of the master substrate 401 and the three slave substrates 501 will be described with reference to FIG. 9. In FIG. 9, in order to simplify a description, reference signs of three slave substrate 501 are reassigned to "501A", "501B", and "501C". As shown in the figure, a slave substrate 501A, the master substrate 401, a slave substrate 501B, and a slave substrate 501C are connected in this order side by side in the transverse direction D2 from one side to the other side in the transverse direction D2. At this time, the slave substrates 501A and 501B disposed on both sides of the master substrate 401 are disposed such that the first slave-side connector 503 is on one side in the longitudinal direction D3 and the second slave-side connector 504 is on the other side in the longitudinal direction D3. The slave substrate 501C is disposed such that the first slave-side connector 503 is on the other side in the longitudinal direction and the second slave-side connector 504 is on one side in the longitudinal direction D3.

The master-side connector 404 of the master substrate 401 disposed on one side in the transverse direction D2 and on one side in the longitudinal direction D3 is connected to the first slave-side connector 503 of the slave substrate 501A disposed on the other side in the transverse direction D2. Accordingly, the switch portion 23 mounted on the slave substrate 501A is connected to the microcomputer 405 via the first slave-side connector 503 and the master-side connector 404. The dummy master-side connector 404 is connected to the second slave-side connector 504 of the slave substrate 501A disposed on the other side in the transverse direction D2.

The master-side connector 404 of the master substrate 401 disposed on the other side in the transverse direction D2 and on one side in the longitudinal direction D3 is connected to the first slave-side connector 503 of the slave substrate 501B disposed on one side in the transverse direction D2. Accordingly, the switch portion 23 mounted on the slave substrate 501B is connected to the microcomputer 405 via the first slave-side connector 503 and the master-side connector 404.

The master-side connector 404 of the master substrate 401 disposed on the other side in the transverse direction D2 and on the other side in the longitudinal direction D3 is connected to the second slave-side connector 504 of the slave substrate 501B disposed on the other side in the transverse direction D2. The second slave-side connector 504 of the slave substrate 501B disposed on the other side in the transverse direction D2 is connected to the first slave-side connector 503 of the slave substrate 501C disposed on one side in the transverse direction D2. Accordingly, the switch portion 23 mounted on the slave substrate 501C is connected to the microcomputer 405 via the first slave-side connector 503, the second slave-side connector 504 provided on the slave substrate 501B, and the master-side connector 404.

As shown in FIG. 1, the switch module 10 includes a first side case 15 and a second side case 16. The first side case 15 is attached to the slave mounting portion 24 disposed at an end on one side in the transverse direction D2. The first side case 15 covers the first and second slave-side connectors 503 and 504 of the slave mounting portion 24 provided on one side in the transverse direction D2 to which the first side case 15 is attached. The second side case 16 is attached to the slave mounting portion 24 disposed at an end on the other side in the transverse direction D2. The second side case 16 covers the first and second slave-side connectors 503 and 504 of the slave mounting portion 24 provided on the other side in the transverse direction D2 to which the second side case 16 is attached.

The above first side case 15 is made of an insulating member such as a synthetic resin. As shown in FIGS. 10A to 10D, the first side case 15 is formed in a substantially flat plate shape orthogonal to the transverse direction D2. The first side case 15 is locked to the locking claws 505B (refer to FIGS. 8A to 8D) provided in the slave mounting portion 24 disposed at an end on one side in the transverse direction D2. As shown in FIG. 10D, in the first side case 15, fitting concave portions 151 into which the male housings 503A and 504A of the first and second slave-side connectors 503 and 504 are fitted are provided on a side face on the other side in the transverse direction D2.

The above second side case 16 is made of an insulating member such as a synthetic resin. As shown in FIGS. 11A to 11D, the second side case 16 is formed in a substantially flat plate shape orthogonal to the transverse direction D2. The second side case 16 is provided with a pair of locking claws 161 on a side face on one side in the transverse direction D2. The locking claws 161 are locked to the case 505 of the slave mounting portion 24 positioned at an end on the other side in the transverse direction D2. As shown in FIGS. 10A to 10C, in the second side case 16, fitting convex portions 162 that are fitted into the female housings 503A and 504A of the first and second slave-side connectors 503 and 504 protrude from a side face on one side in the transverse direction D2. The first and second side cases 15 and 16 can prevent the housings 503A and 504A of the slave mounting portions 24 disposed at both ends in the transverse direction D2 from being exposed.

Figure 12:
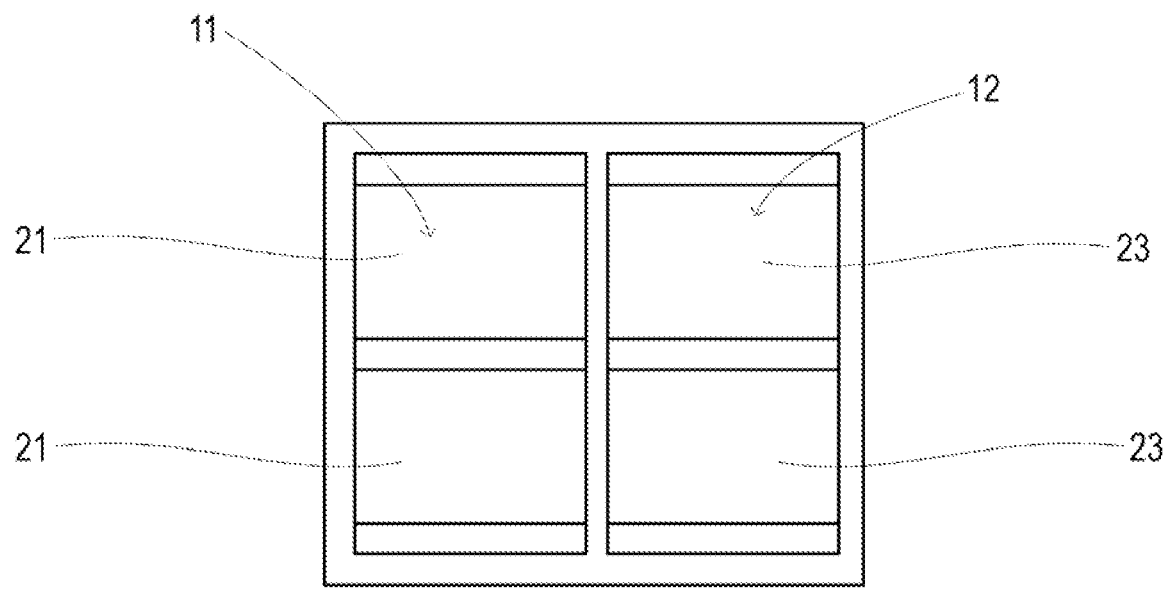
FIG. 12 is a front view of a switch module according to another embodiment.

According to the above embodiment, the master substrate 401 and the slave substrate 501 are provided in the master switch unit 11 and the slave switch unit 12, respectively, so that the master switch unit 11 and the slave switch unit 12 can be connected to each other. Accordingly, by increasing the number of slave switch units 12, the number of switch portions 23 can be increased, and a substrate size corresponding to the number of switches can be obtained. For example, when four switch portions 21 and 23 are required depending on the specification of the vehicle, only one slave switch unit 12 can be connected as shown in FIG. 12. In this case, the substrate size is two.

According to the above embodiment, on the master substrate 401 and the slave substrate 501, the switch portion connectors 403 and 502 are provided, and the switch portions 21 and 23 are detachably mounted. Accordingly, the switch portions 21 and 23 having a size that matches the specification of the vehicle can be mounted. For example, the switch portions 21 and 23 of standard sizes may be mounted on the master substrate 401 and the slave substrate 501 as shown in FIG. 1, and the switch portions 21 and 23 of wide sizes may be mounted as shown in FIG. 12.

Figure 13A:
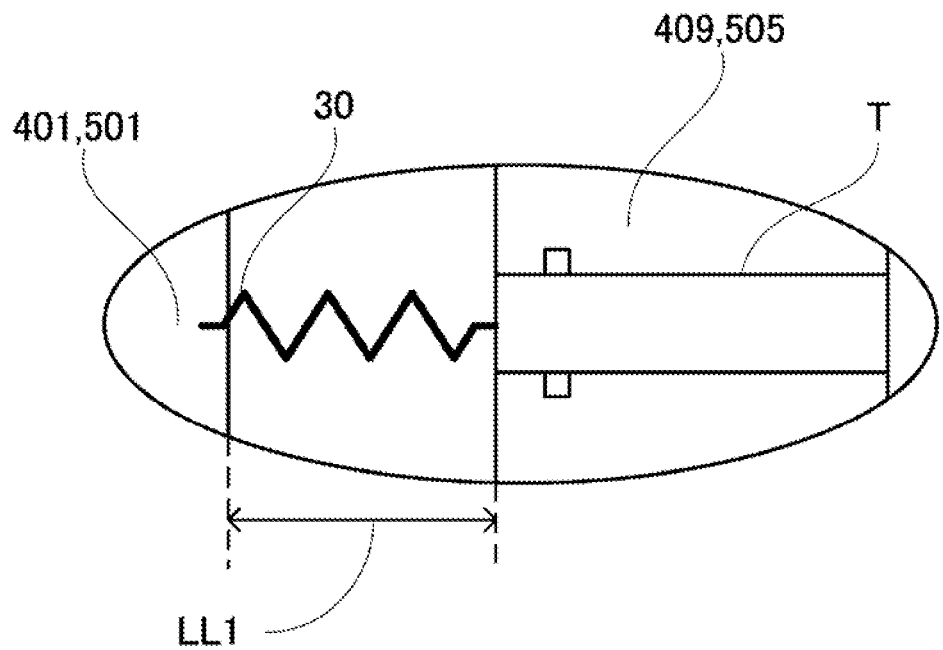
FIG. 13A is a partially enlarged view of a case and a substrate when a switch portion of a standard size is mounted.
Figure 13B:
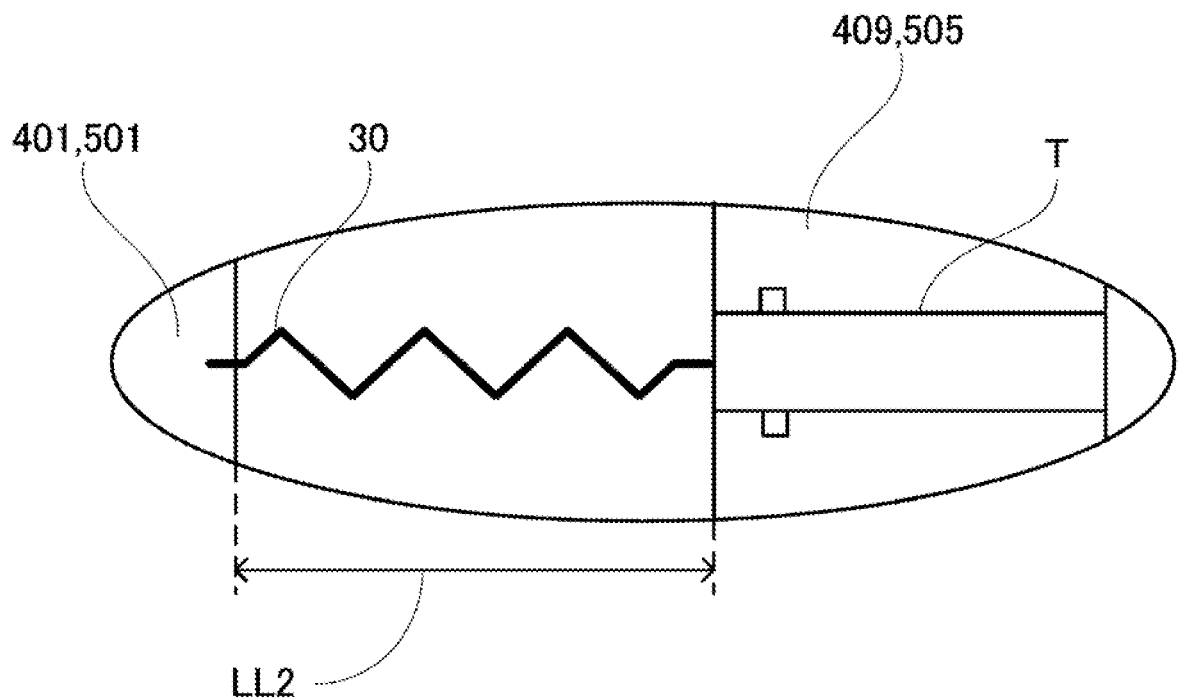
FIG. 13B is a partially enlarged view of a case and a substrate when a switch portion of a wide size is mounted.

Sizes of the substrates 401 and 501 are the same regardless of whether the switch portions 21 and 23 of the standard sizes are mounted or the switch portions 21 and 23 of wide sizes are mounted. In this case, sizes of the cases 409 and 505 are different according to sizes of the switch portions 21 and 23. Now, consider a case where the housings 404A, 503A, and 504A of the connectors 404, 503, and 504 are integrally formed on the cases 409 and 505. As shown in FIGS. 13A and 13B, in the cases 409 and 505 for the standard size and the cases 409 and 505 for the wide size, distances LL1 and LL2 between a housing accommodation position of the terminals T41 to T48, T61 to T68, and T71 to T72 (hereinafter collectively referred to as a "terminal T") and a connection position with the substrates 401 and 501 are different. Therefore, a stretchable portion 30 such as a spring may be provided between a connecting portion of the terminal T to the substrates 401 and 501 and a housing accommodating portion to absorb a difference between the distances LL1 and LL2.

According to the above embodiment, the pair of second slave-side connectors 504, 504 connected to each other are mounted on the slave substrate 501. Accordingly, as shown in FIG. 9, the switch portion 23 mounted on the slave substrate 501C can be connected to the microcomputer 405 of the master substrate 401 via another slave substrate 501B.

According to the above embodiment, the master-side connector 404 is disposed on both sides in the transverse direction D2 on the master substrate 401. The first slave-side connectors 503 are disposed on both sides in the transverse direction D2 on the slave substrate 501, so that the slave substrates 501 can be disposed on both sides in the transverse direction D2 of the master substrate 401.

Second Embodiment

Figure 14:
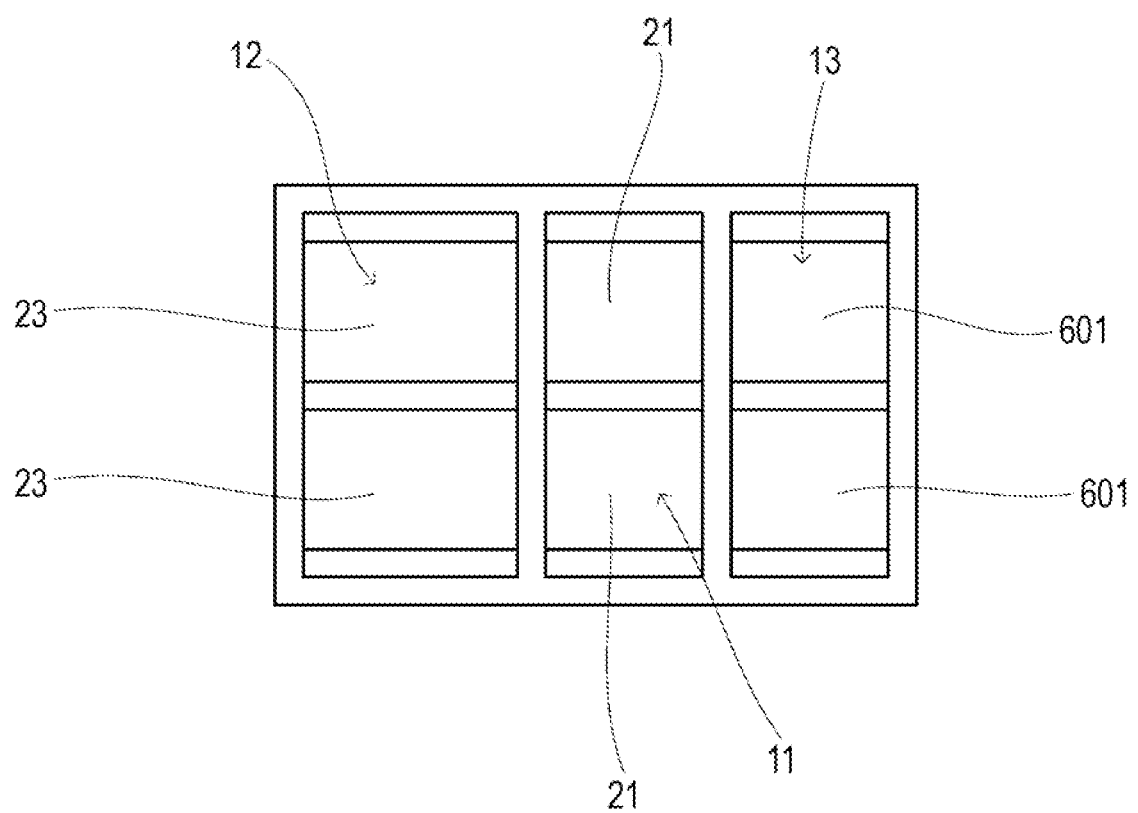
FIG. 14 is a front view of a switch module according to a second embodiment.

Next, a second embodiment of the present embodiment will be described below with reference to the drawings. In the first embodiment, the switch module 10 includes the master switch unit 11 and the slave switch unit 12, but the present disclosure is not limited thereto. As shown in FIG. 14, the switch module 10 may include a conductive-connection switch unit 13.

As shown in FIGS. 15A to 15D, the conductive-connection switch unit 13 includes a conductive-connection switch portion 601 and a case 602 that accommodates the conductive-connection switch portion 601. Since the conductive-connection switch portion 601 has a similar configuration as that of the above switch portions 21 and 23, a detailed description thereof is omitted here.

Figure 15A:
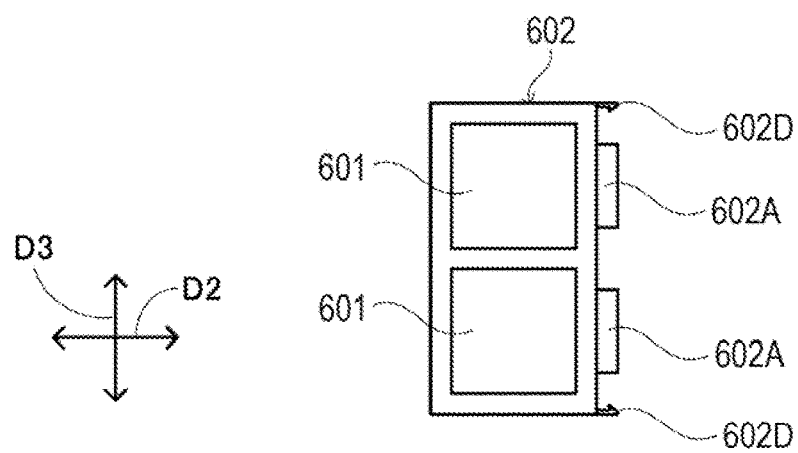
FIGS. 15A to 15D are a front view, a rear view, a left side view, and a right side view of a conductive-connection switch unit shown in FIG. 14.
Figure 15C:
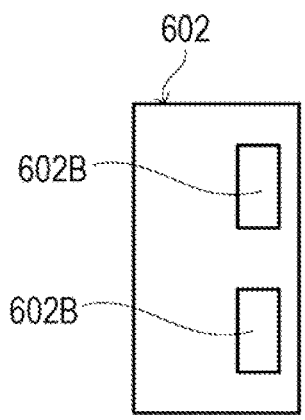
Figure 15B:
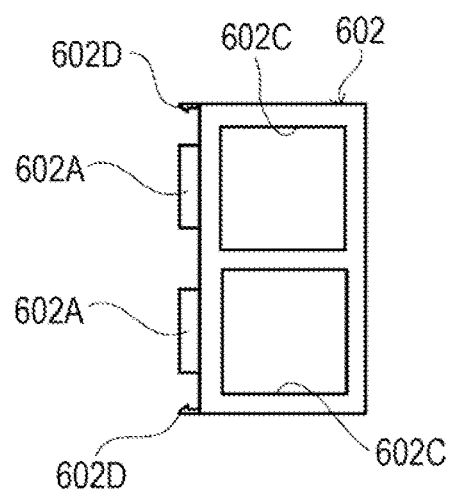
Figure 15D:
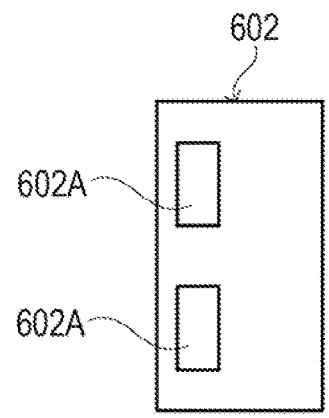

The case 602 is made of an insulating member such as a synthetic resin. As shown in FIGS. 15C and 15D, the case 602 is provided with two male housings 602A on a side face on one side in the transverse direction D2. The two housings 602A are provided side by side along the longitudinal direction D3, and can be fitted into the female housings of the housings 404A, 503A, 504A of the connectors 404, 503, 504 of the master switch unit 11 and the slave switch unit 12.

The case 602 is provided with two female housings 602B on a side face on the other side in the transverse direction D2. The two housings 602B are provided side by side along the longitudinal direction D3, and are fitted into the male housings of the housings 404A, 503A, 504A of the connectors 404, 503, 504 of the master switch unit 11 and the slave switch unit 12. A through hole 602C through which an electric wire (not shown) connected to the conductive-connection switch portion 601 is inserted is provided on a back surface of the case 602. The electric wire connected to the conductive-connection switch portion 601 is directly connected to the BCM 20.

The case 602 is provided with a pair of locking claws 602D protruding from a side face on one side in the transverse direction D2. The pair of locking claws 602D are locked to the cases 409, 505, and 602 of the switch units 11 to 13 adjacent to one side in the transverse direction D2. In the conductive-connection switch unit 13, the master switch unit 11 and the slave switch unit 12, the cases 409, 505, and 602 are locked to each other by the housings 404A, 503A, 504A, 602A, 602B and the locking claws 602D, but are not electrically connected to each other.

According to the above second embodiment, the conductive-connection switch portion 601 that is not connected to the microcomputer 405 of the master switch unit 11 but is directly connected to the BCM 20 can be provided.

The present disclosure is not limited to the above embodiments, and modifications, improvements, and the like can be made as appropriate. In addition, materials, shapes, dimensions, numbers, arrangement positions or the like of each constituent element in the above embodiments are optional and not limited as long as the object of the present disclosure can be achieved.

According to the above embodiments, the microcomputer 405 determines the functions of the switch portions 21 and 23, but the present disclosure is not limited thereto. The microcomputer 405 only needs to be able to determine the ON/OFF of the switch portions 21 and 23, and it is not essential to determine the function.

In addition, according to the above embodiments, the switch portions 21 and 23 are detachably mounted by the connector, but the present disclosure is not limited thereto. The switch portions 21 and 23 may be directly connected to the master substrate 401 and the slave substrate 501.

Here, characteristics of the above embodiments of the switch module, master switch unit, and slave switch unit according to the present disclosure will be briefly summarized and listed in the following [1] to [6].

[1]
A switch module (10) including:
a master switch unit (11) including a master substrate (401), a determination unit (405) mounted on the master substrate (401) and configured to determine an ON/OFF state of a switch portion (21, 23) connected to the determination unit (405), a master-side switch portion (21) mounted on the master substrate (401) and connected to the determination unit (405), and at least one master-side connector (404) mounted on the master substrate (401) and connected to the determination unit (405); and
at least one slave switch unit (12) including a slave substrate (501), a slave-side switch portion (23) mounted on the slave substrate (501), and a first slave-side connector (503) mounted on the slave substrate (501) and connected to the slave-side switch portion (23), in which
the master-side connector (404) is connected to the first slave-side connector (503).

[2]
In the switch module (10) according to [1],
the at least one master-side connector (404) is a plurality of master-side connectors (404);
the at least one slave switch unit (12) is a plurality of slave switch units (12), and a pair of second slave-side connectors (504), which are connected to each other, are mounted on the slave substrate (501) of a first slave switch unit among the plurality of slave switch units (12); and
one of the plurality of master-side connectors (404) is connected to one of the pair of second slave-side connectors (504) of the first slave switch unit (12), and the other of the pair of second slave-side connectors (504) of the first slave switch unit (12) is connected to the first slave-side connector (503) of a second slave switch unit (12) among the plurality of slave switch unit.

[3]
In the switch module (10) according to [1] or [2], the switch module (10) further includes:
a conductive-connection switch unit (13) having a conductive-connection switch portion (601), and
the determination unit (405) is communicable with a control unit (20) and is configured to transmit the ON/OFF state of the switch portion (21, 23) to the control unit (20); and
the conductive-connection switch portion (601) is connected to the control unit (20) by an electric wire.

[4]
In the switch module (10) according to [3],
the conductive-connection switch unit (13) has a case (602) that accommodates the conductive-connection switch portion (601); and
the case (602) is provided with a through hole (602C) through which the electric wire is passed.

[5]
A master switch unit (11) including:
a master substrate (401);
a determination unit (405) mounted on the master substrate (401) and configured to determine an ON/OFF state of a switch portion (21, 23) connected to the determination unit (405);
a master-side switch portion (21) mounted on the master substrate (401) and connected to the determination unit (405); and
a master-side connector (404) mounted on the master substrate (401) and connected to the determination unit (405).

[6]
A slave switch unit (12) including:
a slave substrate (501);
a slave-side switch portion (23) mounted on the slave substrate (501); and
a first slave-side connector (503) mounted on the slave substrate (501) and connected to the slave-side switch portion (23).

According to the switch module having a configuration of the above [1], the master substrate and the slave substrate are provided in the master switch unit and the slave switch unit, respectively, so that the master switch unit and the slave switch unit can be connected to each other. Accordingly, by increasing the number of slave switch units, the number of switches can be increased, and a substrate size corresponding to the number of switches can be obtained.

According to the switch module having a configuration of the above [2], the switch portion mounted on the slave substrate can be connected to the determination unit mounted on the master substrate via another slave switch unit.

According to the switch module having configurations of the above [3] and [4], the switch portion that is not connected to the determination unit on the master switch unit and is directly connected to the control unit can be provided.

According to the master switch unit and the slave switch unit having configurations of the above [5] and [6], the master switch unit and the slave switch unit can be used for the switch module shown in the above [1].

What is claimed is:
1. A switch module comprising:
a master switch unit comprising:
a master substrate;
a determination unit mounted on the master substrate and configured to determine an ON/OFF state of a switch portion connected to the determination unit;
a master-side switch portion mounted on the master substrate and connected to the determination unit; and
at least one master-side connector mounted on the master substrate and connected to the determination unit; and
at least one slave switch unit comprising:
a slave substrate;
a slave-side switch portion mounted on the slave substrate; and
a pair of first slave-side connectors mounted on the slave substrate and connected to the slave-side switch portion; and
a pair of second slave-side connectors mounted on the slave substrate and connected to each other, wherein
the at least one master-side connector of the master switch unit is a plurality of master-side connectors, the at least one slave switch unit is a plurality of slave switch units,
one of the plurality of master-side connectors is connected to one of the pair of first slave-side connectors of a first slave switch unit from among the plurality of slave switch units,
another of the plurality of master-side connectors is connected to one of the pair of second slave-side connectors of the first slave switch unit,
the other of the pair of second slave-side connectors of the first slave switch unit is connected to one of the pair of first slave-side connectors of a second slave switch unit from among the plurality of slave switch units, and
the other of the pair of first slave-side connectors of the first slave switch unit is connected to one of the pair of second slave-side connectors of the second slave switch unit.

2. The switch module according to claim 1, further comprising:
a conductive-connection switch unit comprising a conductive-connection switch portion, wherein
the determination unit is communicable with a control unit and is configured to transmit the ON/OFF state of the conductive-connection switch portion to the control unit; and
the conductive-connection switch portion is connected to the control unit by an electric wire.

3. The switch module according to claim 2, wherein
the conductive-connection switch unit comprises a case that accommodates the conductive-connection switch portion; and
the case includes a through hole through which the electric wire is passed.

* * * * *